(12) United States Patent
Stanhope et al.

(10) Patent No.: US 11,987,683 B2
(45) Date of Patent: *May 21, 2024

(54) POLYMER-BASED CONSTRUCTION MATERIALS

(71) Applicant: The AZEK Group LLC, Chicago, IL (US)

(72) Inventors: Bruce Edward Stanhope, Waynesville, OH (US); Peter Warburton, Tunkhannock, PA (US); Daniel Wesley Davies, Clarks Summit, PA (US); David Joel Parker, Middleville, MI (US); Jeffrey S. Ross, Lancaster, PA (US)

(73) Assignee: The AZEK Group LLC, Chicago, IL (US)

( * ) Notice: Subject to any disclaimer, the term of this patent is extended or adjusted under 35 U.S.C. 154(b) by 55 days.

This patent is subject to a terminal disclaimer.

(21) Appl. No.: 17/699,867

(22) Filed: Mar. 21, 2022

(65) Prior Publication Data

US 2022/0204713 A1 Jun. 30, 2022

Related U.S. Application Data

(63) Continuation of application No. 16/572,415, filed on Sep. 16, 2019, now Pat. No. 11,306,191.

(60) Provisional application No. 62/732,447, filed on Sep. 17, 2018.

(51) Int. Cl.
| | | |
|---|---|---|
| C08J 7/18 | (2006.01) |
| B29C 59/02 | (2006.01) |
| B29C 59/14 | (2006.01) |
| C08K 3/22 | (2006.01) |
| C08K 3/26 | (2006.01) |
| C08L 27/06 | (2006.01) |
| E04B 1/348 | (2006.01) |

(52) U.S. Cl.
CPC .............. *C08J 7/18* (2013.01); *B29C 59/02* (2013.01); *B29C 59/14* (2013.01); *C08K 3/22* (2013.01); *C08K 3/26* (2013.01); *C08L 27/06* (2013.01); *B29C 2059/027* (2013.01); *C08K 2003/2241* (2013.01); *C08K 2003/265* (2013.01); *E04B 1/34846* (2013.01); *E04B 2103/04* (2013.01)

(58) Field of Classification Search
None
See application file for complete search history.

(56) References Cited

U.S. PATENT DOCUMENTS

| | | | |
|---|---|---|---|
| 2003/0175488 A1 | 9/2003 | Asthana et al. | |
| 2007/0057411 A1* | 3/2007 | Williams | B29B 13/08 |
| | | | 264/483 |
| 2010/0003523 A1* | 1/2010 | Sharygin | B29C 45/14688 |
| | | | 264/269 |
| 2010/0260941 A1* | 10/2010 | Bushmire | C08J 5/249 |
| | | | 427/520 |
| 2013/0136929 A1 | 5/2013 | Guha et al. | |
| 2016/0024329 A1* | 1/2016 | Zhang | C09D 11/02 |
| | | | 522/64 |
| 2016/0237063 A1* | 8/2016 | Schleth | C08K 3/04 |
| 2018/0002932 A1 | 1/2018 | Van Giel et al. | |
| 2020/0291214 A1* | 9/2020 | Cherian | C08L 33/10 |

* cited by examiner

*Primary Examiner* — Robert T Butcher
(74) *Attorney, Agent, or Firm* — Shook, Hardy & Bacon L.L.P.

(57) ABSTRACT

Aspects described herein are directed to compositions, systems, and methods of manufacturing a polymer-based construction material comprising polymeric resin and filler such as calcium carbonate ($CaCO_3$). A surface of the polymer-based construction material may be treated such that the surface energy is increased from the material's inherent value to a predetermined value of at least 40 dynes/$cm^2$. Further, the surface energy of the treated surface may persist within 20% of the predetermined value for at least three days.

20 Claims, 4 Drawing Sheets

POLYMER-BASED CONSTRUCTION MATERIALS

CROSS-REFERENCE TO RELATED APPLICATIONS

This Non-Provisional patent application claims priority to U.S. patent application Ser. No. 16/572,415, filed Sep. 16, 2019, titled "Polymer-Based Construction Materials", which benefit of U.S. Provisional Patent Application No. 62/732,447, filed Sep. 17, 2018, titled "Polymer-Based Construction Materials" and both of which are hereby incorporated by reference in their entirety.

BRIEF SUMMARY

A high-level discussion of various aspects of the technology described herein is provided as an overview of the disclosure and to introduce a selection of concepts that are further described in the detailed description section below. This summary is not intended to identify key features or essential features of the claimed subject matter, nor is it intended to be used as an aid in isolation to determine the scope of the claimed subject matter.

Polymer-based construction materials, such as vinyl siding, are traditionally colored by mixing a colorant into the polymer-based composition during manufacture. Painting traditional polymer-based construction materials can be difficult. For example, painting can be inhibited because of additives, such as external lubricants, that lower the surface energy of the polymer-based construction material. However, aspects described herein provide polymer-based construction materials that retain the advantages of standard materials, while additionally providing a window of at least three days for post-manufacture painting. Further, aspects described herein provide improved paint wet-out during the paint application process. Following application of paint, aspects described herein can provide an enhanced bond between the paint and the surface of the polymer-based construction material.

BACKGROUND

Polymer-based construction materials are currently manufactured, for example, using extrusion technology. However, polymer-based materials can be difficult to paint. For example, adhesion of typical exterior latex paint to current formulations of polymer-based construction material is relatively poor without proper traditional preparation with additional coatings and processes. In some cases, the interfacial tension of the material can be substantially lower than that of modern water-based exterior latex paints. This is problematic for both end users and to industrial pre-finish operations that desire colors other than as-manufactured colorations.

BRIEF DESCRIPTION OF THE DRAWINGS

Illustrative embodiments of the present invention are described in detail below with reference to the attached drawing figures, and wherein.

DETAILED DESCRIPTION

Figure 1:
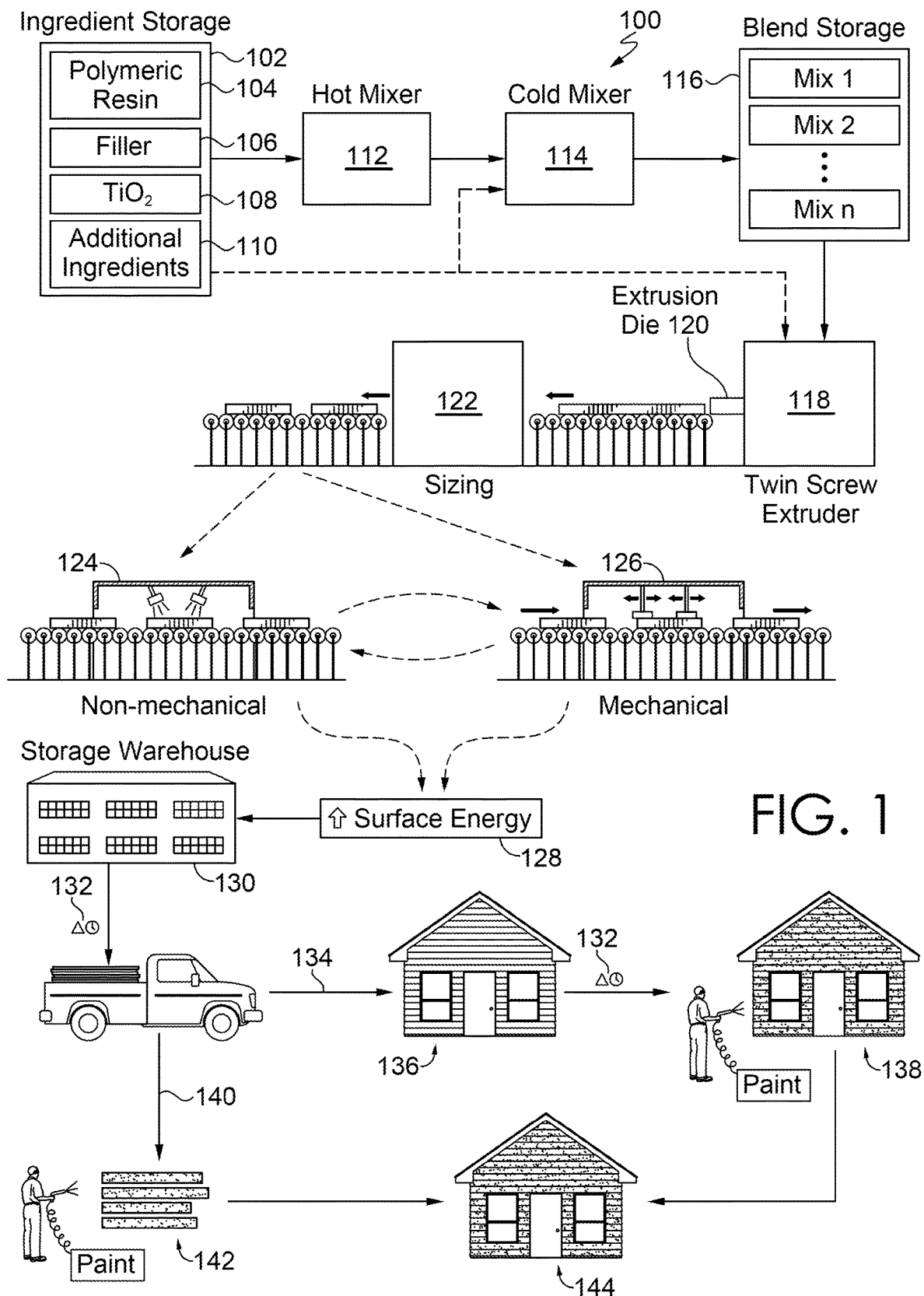
FIG. 1 depicts an example system, according to aspects described herein.

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

As used herein, the term "paint" and the term's various forms refers to a pigment containing material (commonly referred to as paint, dye, stain, and so on); an adhesive or adhesion promoter (such as a primer); a transparent, semi-transparent, or opaque luster altering material (such as materials that increase, decrease, preserve or otherwise modify reflectivity, sheen, or gloss); and a protectant. As such, the term "painting" is the application of "paint," as defined above.

As used herein, polymer-based construction materials include foamed and non-foamed polymer-based compositions unless and except where expressly and explicitly stated otherwise. Polymer-based construction materials can include trim components (e.g. trim boards), siding components (e.g. siding boards, siding shingles, siding sheets), roofing components (e.g. roofing boards, roofing shingles, roofing sheets), decking components (e.g. decking boards, decking sheets, deck flooring, deck railings), decorative and/or functional construction accessories, and any other construction materials. Additionally, polymer-based construction materials can be assembled to form a corner board, column wrap, post cover, molding, or any other multi-component construction material.

Plasma is an ionized gas and is one of the four fundamental states of matter. Plasma is a gas (e.g., multiple element gas and single element gas) into which sufficient energy is provided to free electrons from atoms or molecules and to allow both species, ions and electrons, to coexist. Stated differently, plasma is an ionized gas consisting of positive ions and free electrons in proportions resulting in more or less no overall electric charge. Plasma may exist in both a thermal and a non-thermal form. The distinction between thermal and non-thermal may be determined by the temperature of electrons, ions, and neutrals. Thermal plasmas have electrons and the heavy particles at substantially the same temperature, i.e., they are in thermal equilibrium with each other. Non-thermal plasmas have the ions and neutrals at a much lower temperature, whereas electrons are at a significantly greater temperature. Aspects provided herein rely on a non-thermal plasma for increasing the surface energy of at least one surface of a polymer-based construction material from the material's inherent surface energy to a predetermined surface energy, in accordance with an exemplary aspect.

While the use of polymer-based construction materials in construction projects provide a number of beneficial results, polymer-based construction materials with traditional composition and surface treatment have limitations. Namely, post-manufacture painting options are limited. For example, adhesion of traditional exterior latex paints to current formulations of polymer-based construction materials is relatively poor, as the interfacial tension of the material is typically substantially lower than modern water-based exterior latex paints.

Said another way, the drying and adhesive bond characteristics of painted polymer-based products (such as polyvinyl chloride products) using current product formulations is far from ideal. For end users, painting may require solvent wipes, sanding, tack cloth wipes, and other steps before the paint can even be applied. This preparation work is added labor and risk. Further, the formation of the adhesive bond between traditional polymer-based construction material and paint is slow, often requiring days or weeks to reach a full strength of 5B adhesion (as measured by ASTM D3359 cross hatch adhesion tests detailed in the 2018 volume of *ASTM Tests for Chemical, Physical, and Optical Properties*). Pre-finish operations encounter similar problems but may be further hindered because of the limited manual and automated handling that can be performed as the construction material and paint bond.

One way to address this problem is to increase the surface energy (dynes/cm$^2$) of the polymer-based construction material. A sufficiently large increase in the surface energy may facilitate adhesion of paint applied to the surface of the polymer-based construction material. Accordingly, as provided herein, the recited polymeric composition comprising polymer resin, filler—such as calcium carbonate ($CaCO_3$)—and, in some aspects, titanium oxide ($TiO_2$) is treated such that the surface energy is increased to at least 40 dynes/cm$^2$ through mechanical or non-mechanical methods. Further, this surface energy increase persists within 20% of the increased value for at least three days from the treatment of the surface. Specific compositions and surface treatments are provided herein that are capable of achieving and maintaining a target minimal surface energy capable of allowing a sufficient bond strength between the polymer-based construction material and the paint applied later in time (e.g., at least three days after the extrusion of the polymer-based material). Additionally, some aspects described herein facilitate the application of exterior paints to the polymer-based construction material with an adhesion of 4B-5B at least three days post-treatment (in some aspects, at least one month, three months, six months, or twenty months).

With reference to FIG. 1, an example system 100 is provided in accordance with aspects described herein. Generally, system 100 facilitates the manufacture of a polymer-based construction material and treatment of a surface of the polymer-based construction material. In some aspects, the polymer-based construction material comprises a polymeric resin, a filler (such as $CaCO_3$), and ≤7% $TiO_2$. The treatment increases the surface energy of the surface from an inherent value to a predetermined value of at least 40 dynes/cm$^2$. Additionally, the surface energy persists within 20% of the predetermined value for at least three days. Said another way, aspects of system 100, method 200, and method 210 facilitate the production of a polymer-based construction material, such as polymer-based construction material 302, with an enhanced surface energy that persists for at least three days. Some aspects of system 100 comprise a pre-mix ingredient storage container 102, hot mixer 112, cold mixer 114, post-mix blend storage container 116, extruder 118, extrusion die 120, post-extrusion sizing process 122, and a post-extrusion treatment process that increases the surface energy of a surface of the polymer-based construction material to at least 40 dynes/cm$^2$.

Figure 2A:
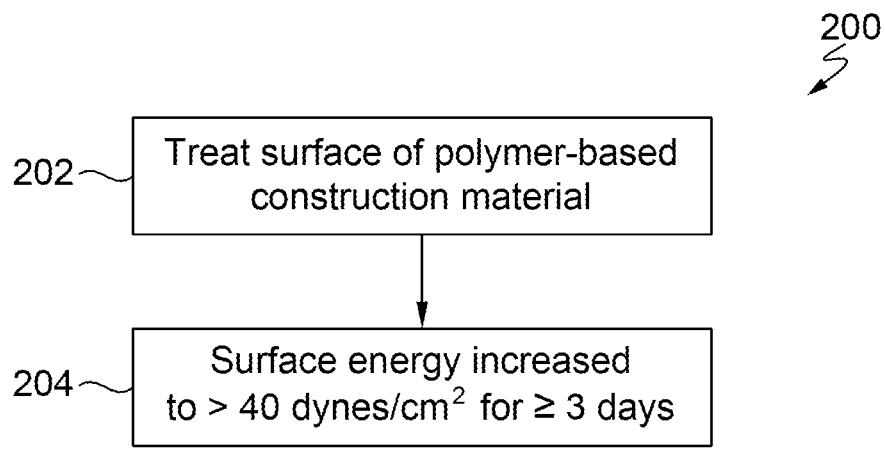
FIG. 2A depicts an example method for the post-manufacturing treatment of a polymer-based construction material, according to aspects described herein.
Figure 2B:
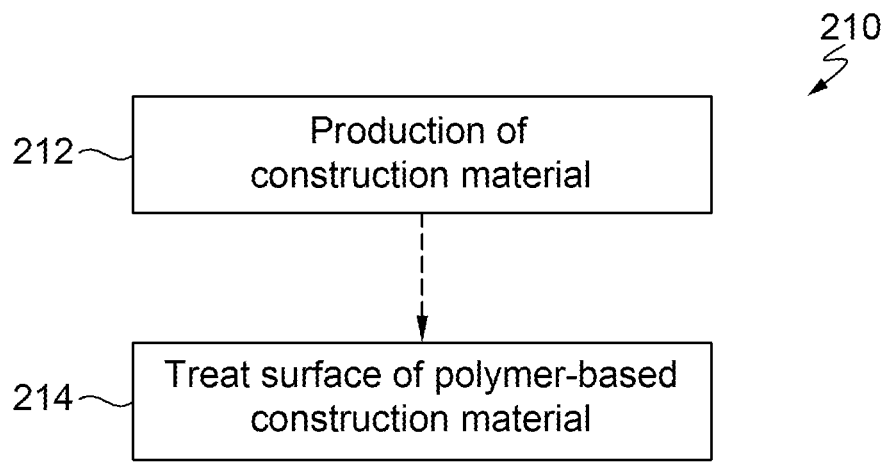
FIG. 2B depicts an example method for the manufacture and treatment of a polymer-based construction material, according to aspects described herein.

Turning to FIG. 2B and with continued reference to FIG. 1, a method 210 for the production and treatment of a polymer-based construction material in accordance with aspects described herein is provided. In some aspects, method 210 may be facilitated by system 100. In an example aspect, at block 212 a polymer-based construction material is produced. The production of the polymer-based construction material begins, in some aspects, at a pre-mix ingredient storage container, such as pre-mix ingredient storage container 102. Ingredient storage container 102 may hold a polymeric resin 104, filler 106, and $TiO_2$ 108 in independent storage vessels. The polymeric resin 104 can comprise one or more (or any combination thereof) polyvinyl chloride (PVC); acrylonitrile; alpha-olefins such as ethylene, propylene, etc.; chlorinated monomers such as vinylidene, dichloride; acrylate monomers such as acrylic acid, methylacrylate, methyl-methacrylate, acrylamide, hydrox-ethyl acrylate, and others; styrenic monomers such as styrene, alpha methyl styrene, vinyl toluene, etc.; vinyl acetate; and other commonly available ethylenically unsaturated monomer compositions.

In some aspects, the polymeric resin 104 does not include a plasticizer, such as diisononyl phthalate (DINP), diisodecyl phthalate (DIDP), or similar compounds. The omission of a plasticizer may enhance the polymer-based construction material's retention of subsequent increases to surface energy. For example, a plasticizer may be omitted, in some embodiments, such that the matrix of the polymer-based construction material retains increases to the surface energy (by for example, the mechanical and/or non-mechanical treatments described herein) for at least three days. Additionally, the polymeric resin 104 can include virgin polymeric resin(s) and recycled polymeric resin(s). As used herein, a virgin polymeric resin refers to a resin that includes at least one polymer that is not recycled or a recovered scrap.

In some aspects, filler 106 comprises one, more than one, or any combination of: $CaCO_3$ or compounds (naturally occurring, refined, manufactured, or produced) containing $CaCO_3$, such as limestone, dolomite, aragonite, precipitated $CaCO_3$, and so forth; fieldstone; granite; and clay and clay containing compounds such as talc, smectite, calcium silicates, aluminum silicates, and so forth. Further, in some aspects, ingredient storage container 102 holds additional ingredients 110, such as a thermal stabilizer, acrylic process aid, internal and external lubricants, wax, pigment, and/or a blowing agent. Additionally, ingredient storage container 102 may comprise a molecular sieve, in some aspects. In some aspects, the additional ingredients 110 includes a high molecular weight (BMW) acrylic process aid, such as 2-Propenoic acid, 2-methyl-, methyl ester, polymer with butyl 2-propenoate and ethenylbenzene acid or other similar compounds. The acrylic modifier may enhance the polymer-based construction material's retention of subsequent increases to surface energy. For example, the acrylic modifier may be included, in some embodiments, to modify the matrix of the polymer-based construction material such that post-extrusion increases to the surface energy (by for example, the mechanical and/or non-mechanical treatments described herein) can be retained for at least three days.

Some aspects of block 212 further comprise mixing a predetermined amount of each of the polymeric resin 104, filler 106, and $TiO_2$ 108. The mixing may be facilitated by adding the materials from the ingredient storage container 102 to a hot mixer 112 and/or a cold mixer 114 through a vacuum transfer system, volumetric feeder, gravimetric feeder, or other similar processes. The predetermined amount of each material may vary based on the desired properties and intended use of the resulting polymer-based construction material. In some aspects, the mix comprises: between 45% and 90% of polymeric resin 104 by weight or mass; ≥5% filler by weight or mass; and ≤7% $TiO_2$ by weight or mass. In some aspects, the mix comprises: between 45% and 85% of polymeric resin 104 by weight or mass; ≥8% $CaCO_3$ by weight or mass; and ≤7% $TiO_2$ 108 by weight or mass. In some aspects, the additional ingredients 110 comprise between 5% and 20% of the mix by weight or mass. For a non-limiting illustrative example, for a mix with a target weight of 100 lbs a vacuum transfer system may deposit 75 lbs of polymeric resin(s) 104, 10 lbs of filler 106 (such as $CaCO_3$), and 0.75 lbs of $TiO_2$ 108 into hot mixer 112. This initial mix may be blended in the hot mixer 112 until satisfactorily homogenous. The initial mix may then be transferred to cold mixer 114 and 14.25 lbs of additional ingredients may be added resulting in 100 lbs of mix. The mix may continue to blend in the cold mixer 114 until satisfactorily homogenous.

Some aspects of block 212 further comprise aging the mixed material for a predetermined period of time. For example, some aspects of system 100 transfer the mixed material from a mixer to a post-mix blend storage container 116 through a vacuum transfer system, volumetric feeder, gravimetric feeder, or other similar processes. The predetermined period of time may be less than 6 hours, at least 6 hours, at least 12 hours, or at least 24 hours. The post-mix blend storage container 116 may store mixes of different compositions in separate aging vessels.

Some aspects of block 212 further comprise extruding the initial mix or the aged mix into a sheet of a pre-treatment polymer-based construction material. For example, after the predetermined period of time has elapsed, the aged mix can be transferred to an extruder, such as extruder 118. In a non-limiting example, extruder 118 comprises a twin screw extruder. The extruder 118 may force the aged mix through an extrusion die 120 of the desired gauge and cross-sectional pattern. The gauge may be any thickness, such as those described in relation to gauge 308. The density of the polymer-based sheet may vary determined based on the intended final use of the material. For example, the polymer-based sheet may be a cellular or foamed polymer-based material of varied density.

The newly formed polymer-based sheet may be cooled after exiting the extrusion die 120 via calender rolls, conveyers, or any other suitable system. In some aspects of block 212, the foamed sheet can be divided into two, more than two, or a plurality of sheets of uniform or non-uniform widths and lengths, such as described in relation to width 318 and length 306 of FIG. 3. Accordingly, the foamed sheet can be transported by conveyers or any other suitable means to post-extrusion sizing process 122, in some aspects of system 100. As will be understood by those skilled in the art, the temperature suitable for division can vary based on the specific composition of the mix used to manufacture the foamed sheet, the technique used to divide the foamed sheet by post-extrusion sizing process 122, manufacturing tolerances, and/or other factors. Post-extrusion sizing process 122 can be a manually operated or computer controlled saw, pressurized liquid cutting device, pressurized gas cutting device, or any other suitable cutting device. In some aspects, scrap portions (also referred to as regrind, recycled, or recovered) of the foamed sheet can be ground and reused as an additional ingredient 110 or a mix in post-mix blend storage container 116.

At block 214, the surface of a polymer-based construction material is treated such that the surface energy is increased from the inherent surface energy to a predetermined value. In an example aspect, the inherent surface energy is between 30 and 38 dynes/$cm^2$. In aspects, the predetermined value is greater than or equal to ("≥") 40 dynes/$cm^2$. For example, in an aspect, the predetermined value is between 40 dynes/$cm^2$ and 80 dynes/$cm^2$. In an aspect, the predetermined value is between 40 dynes/$cm^2$ and 75 dynes/$cm^2$. In an aspect, the predetermined value is between 45 dynes/$cm^2$ and 75 dynes/$cm^2$. In an aspect, the predetermined value is between 50 dynes/$cm^2$ and 60 dynes/$cm^2$. In an aspect, the predetermined value is between 50 dynes/$cm^2$ and 58 dynes/$cm^2$. In an aspect, the predetermined value is between 45 dynes/$cm^2$ and 60 dynes/$cm^2$. Different predetermined values may be selected for different compositions, materials, intended duration of pre-painting window, and the like.

At block 214, a surface of the polymer-based construction material is treated. In some aspects of block 214, the polymer-based construction material is the sized sheet(s) or the foamed sheet from block 212. The treatment may comprise a mechanical treatment, a non-mechanical treatment, or any combination thereof to the surface of the polymer-based construction material. For example, in an aspect, system 100 may comprise a mechanical treatment device 126 that intentionally scuffs, sands, grinds or abrades a surface of the polymer-based construction material such that the surface energy of the surface is increased to the predetermined value 128. The sanding or scuffing treatment may be facilitated using an orbital sander, random orbital sander, rotary brush, rotary sander, cylindrical sander, block sander, hand sander, or any other device suitable for mechanically scuffing, sanding, or abrading a surface. In a non-limiting example aspect, the mechanical treatment device 126 sands the surface of the polymer-based construction material with between 16 grit and 300 grit material (or its equivalent) such that the surface energy is increased from the polymer-based construction material's inherent surface energy to the predetermined surface energy (or to a surface energy above the inherent surface energy when a secondary process is performed to increase the surface energy to the predetermined surface energy). In some aspects, mechanical treatment can be advantageous where non-mechanical treatment may cause the unintentional weakening of internal polymeric bonds of some compositions of the polymer-based construction material described herein. For example, due to thermal energy exposure during some non-mechanical treatments, a degradation of polymeric attributes may occur. Therefore, a mechanical treatment is a suitable alternative in some of these aspects.

Additionally, or alternatively, the treatment comprises a non-mechanical thermal, flame, plasma, corona treatment, or coating treatment to the surface of the polymer-based construction material. Accordingly, system 100 may comprise a non-mechanical treatment device 124 such as a plasma torch, a corona treatment system, or a coating system. Because some aspects of the mechanical treatment may remove a measurable thickness of the polymer-based construction material's outer-surface, non-mechanical treatment may be advantageous where mechanical treatment may cause unintentional exposure of the polymer-based construction materials internal matrix. For an illustrative example, non-mechanical treatment may be advantageous for some compositions of foamed polymer-based construction materials where mechanical treatment may expose the internal foam matrix. In an exemplary aspect, the plasma torch is a plasma generator that utilized a multi-gas composition (e.g., atmospheric air) to form the plasma. For example, it is contemplated that the application of plasma to the component occurs at atmospheric pressure, which allows for a continuous processing (rather than batch processing). Plasma generated at atmospheric conditions is referred to as atmospheric pressure plasma. The plasma torch generates plasma by a high voltage between an anode and cathode, which is blown out through a nozzle on the plasma torch with a working gas, such as atmospheric air. The frequency of energy and a pulsing pattern (e.g., single pulse of energy, double pulse of energy) of the energy may be varied to form the plasma, in some aspects. It is contemplated that a rotary nozzle may be implemented to apply plasma in a pulse-like manner to limit the heat input to the surface, which could deform, discolor, or otherwise negatively affect a polymer-based construction material. The nozzle and the number of plasma application passes may be adjusted to achieve a desired surface energy while maintaining a temperature below a predefined value, in an exemplary aspect. For example, and with brief reference to FIGS. 3A and 3B, a first surface 304 of polymer-based construction material 302 can be treated with ionized plasma such that the surface energy increases from the polymer-based construction material's inherent surface energy to the predetermined surface energy (or to a surface energy above the inherent surface energy when a secondary process is performed to increase the surface energy to the predetermined surface energy).

In another exemplary aspect, a corona treatment system applies high-frequency power through a ceramic or metal electrode array across an intentional air gap onto the surface of the polymer-based construction material. The corona device can be a bare roller, a covered roller, or any other corona device. A corona treatment system generates an ionized corona discharge that increases the surface energy of the surface. The corona treatment system can increase the surface energy of a surface of the polymer-based construction material from its inherent surface energy to the predetermined surface energy. For example, and with brief reference to FIGS. 3A and 3B, a first surface 304 of polymer-based construction material 302 may be treated by the corona treatment system such that the ionized blown gas is incorporated into the first surface 304. As a result, the surface energy of the first surface 304 may increase from the polymer-based construction material's inherent surface energy to the predetermined surface energy (or to a surface energy above the inherent surface energy when a secondary process is performed to increase the surface energy to the predetermined surface energy). In some aspects, corona treatment can be advantageous as the precision and relatively low temperature of the corona electrode array may facilitate uniform surface energy enhancement of some compositions of the polymer-based construction material described herein.

In yet another exemplary aspect, a coating system applies at least one of a coating of UV curable monomers, oligomers, adhesion promoters, primers, photoinitiators, and pigments. Additionally, in some aspects, the coating may comprise an acrylate, such as THF acrylate, beta carboxy ethyl acrylate, ethyl hexyl acrylate, N-vinyl pyrolidone, and any other acrylate compound. The coating system may comprise one or more computer or manually controlled sprayers, vacuum applicator, curtain coater, slot die applicator, and roll coater. As an illustrative example, a pre-metered coating with a viscosity between 300 and 2000 cP is applied to the surface of the polymer-based construction material by a curtain coater. Turing briefly to FIG. 3C, and with continued reference to FIG. 1, the coating system may apply the coating 320 with a thickness of between 5 and 37 microns to at least surface 304 of the polymer-based construction material 302. In some aspects, the coating 320 is applied with a thickness of between 10 and 30 microns. In some aspects, the coating 320 is applied with a thickness of between 12 and 25 microns. After the coating 320 is applied to the surface 304, the polymer-based construction material 302 can be treated with radiation from a mercury arc lamp, microwave powered sealed mercury arc lamp, and/or UV LED array incorporated with or independent from the coating system until the coating is cured. The radiation can be of a wavelength between 350 nm and 410 nm. In an aspect, the wavelength is between 385 nm and 405 nm. Because a coating with a viscosity between 300 and 2000 cP is applied in an example from a curtain coater, with a thickness between 10 and 30 microns, and cured by radiation with a wavelength between 350 nm and 410 nm; the surface energy must be increased to at least 40 dynes/cm$^2$. Additionally, subsequent painting can achieve an adhesive bond of at least 4B bond at least 3 days after coating.

At least one advantage provided by method 210 in combination with the compositions described herein may be that the surface energy of the treated surface persists for significantly longer periods of time than previously believed possible. In some aspects of method 210, the surface energy of the polymer-based construction material manufactured in accordance with block 212 and treated in accordance with aspects of block 214 persists within 20% of the predetermined surface energy for ≥3 days. In some aspects, the post-treatment surface energy persists within 20% of the predetermined surface energy for ≥1 month. In some aspects, the post-treatment surface energy persists within 20% of the predetermined surface energy for ≥3 months. In some aspects, the post-treatment surface energy persists within 20% of the predetermined surface energy for ≥6 months. In some aspects, the post-treatment surface energy persists within 20% of the predetermined surface energy for ≥20 months. Said another way, method 210 and/or the compositions described in relation to method 210 may enable temporary storage of polymer-based construction material in a warehouse, retailer, and/or so on (collectively 130), without painting, for a period of time post-treatment 132. For an example, a post-manufacturing finisher, contractor, end user, or any other person or entity may acquire and hold the polymer-based construction material without painting (as indicated at 140), for a period of time post-treatment 132. The polymer-based construction material may then be painted 142 when needed, ordered, or otherwise requested. For example, a post-manufacturing finisher may store an unpainted polymer-based construction material post-treatment, until an order for a specific color of painted polymer-based construction material is requested. The post-manufacturing finisher may then paint 142 the polymer-based construction material and the painted material can be used for its intended purpose, such as siding for a building 144, decking, shingles, trim, or any other suitable purpose.

Additionally, or alternatively, the polymer-based construction material may be transported 134 to and used for its intended purpose, without painting, for a period of time post-treatment 132. For an illustrative example, the intended purpose can be siding of a building 136, decking, shingles, trim, or any other suitable purpose. Later the polymer-based construction material can be painted 138 at least partially, because the composition of the polymer-based construction material enables the post-treatment surface energy to persist within 20% of the predetermined surface energy for ≥3 days, ≥1 month, ≥3 months, ≥6 months, or ≥20 months. Accordingly, the recited polymeric composition comprising $CaCO_3$ and ≤7% $TiO_2$ that is treated to have a surface energy of at least 40 dynes/cm$^2$ through aspects of block 214 is able to have a surface energy that persists within 20% for at least three days from the treatment of the surface. The surface energy may be tested by, for example, a dyne pen or any other suitable testing method. Although FIG. 1 depicts the polymeric composition in a siding form factor, it is contemplated that the polymeric composition can take any form. For example, the polymer-based construction materials can be assembled to form decking, shingles, trim, a corner board, column wrap, post cover, molding, or any other single component or multi-component construction material.

Turning now to FIG. 2A, a method 200 of preparing a polymer-based construction material for future painting is provided in accordance with aspects described herein. Generally, method 200 comprises increasing the surface energy of the surface of a polymer-based construction material from its inherent surface energy to ≥40 dynes/cm$^2$ through a treatment. Said another way, the surface energy of a polymer-based construction material may be increased from a first surface energy to a second surface energy of at least 40 dynes/cm$^2$ in response to treatment of the surface. In some aspects, the surface energy of the surface persists within 20% of the second surface energy for at least three days. In some aspects, the polymeric composition of the polymer-based construction material comprises a polymeric resin, one or more fillers, and titanium oxide ($TiO_2$). In an example aspect, the filler includes $CaCO_3$. Method 200 can be used to treat the polymer-based construction material, such as the polymer-based construction material 302 (as described in reference to FIGS. 3A, 3B, and 3C). Further, some aspects of method 200 can be facilitated by some or all of system 100.

Some aspects of method 200 begin at block 202 with the treatment of a surface of a polymer-based construction material. The treatment may comprise a mechanical treatment, a non-mechanical treatment, or any combination thereof to the surface of the polymer-based construction material. For example, in an aspect, the treatment comprises the mechanical sanding or scuffing of the surface. In some aspects, mechanical treatment can be advantageous where non-mechanical treatment may cause the unintentional weakening of internal polymeric bonds of some compositions of the polymer-based construction material described herein. The sanding or scuffing treatment may be facilitated using an orbital sander, random orbital sander, rotary brush, rotary sander, cylindrical sander, block sander, hand sander, or any other device for mechanically scuffing, sanding, or abrading a surface. In an example aspect, the mechanical treatment device 126 sands the surface of the polymer-based construction material with between 16 grit and 300 grit material (or its equivalent) such that the surface energy is increased from the polymer-based construction material's inherent surface energy to a predetermined surface energy. In aspects, the surface treatment is performed on 80%, 90%, 95%, or 100% of a surface of the article. This is in contrast to accidental operation that occur at finite locations of a surface, such as through inadvertent mechanical operations on finite portions of a polymer article during a construction project. As the ultimate goal is to achieve a sufficient paint bond allowing for a uniform and consistent appearance from the application of paint onto the treated surface, inadvertent and accidental mechanical operations on small portions of a surface will not achieve a uniform and consistent painted surface.

In some aspects, the treatment at block 202 comprises a non-mechanical thermal, flame, plasma, corona treatment, or coating treatment to the surface of the polymer-based construction material. Because some mechanical treatments in certain aspects may remove a measurable thickness of the polymer-based construction materials outer-surface, non-mechanical treatment may be advantageous where mechanical treatment may cause unintentional exposure of the polymer-based construction materials internal matrix. For an illustrative example, non-mechanical treatment may be advantageous for some compositions of foamed polymer-based construction materials where mechanical treatment may expose the internal foam matrix. In an exemplary aspect, the plasma torch is a plasma generator that utilizes a multi-gas composition (e.g., atmospheric air) to form the plasma. For example, it is contemplated that the application of plasma to the component occurs at atmospheric pressure, which allows for a continuous processing (rather than batch processing). Plasma generated at atmospheric conditions is referred to as atmospheric pressure plasma. The plasma torch generates plasma by a high voltage between an anode and cathode, which is blown out through a nozzle on the plasma torch with a working gas, such as atmospheric air. The frequency of energy and a pulsing pattern (e.g., single pulse of energy, double pulse of energy) of the energy may be varied to form the plasma, in some aspects. It is contemplated that a rotary nozzle may be implemented to apply plasma in a pulse-like manner to limit the heat input to the component, which could deform or otherwise negatively affect a polymer-based material. The nozzle and the number of plasma application passes may be adjusted to achieve a desired surface energy while maintaining a temperature below a predefined value, in an exemplary aspect. For example, and with brief reference to FIGS. 3A and 3B, a first surface 304 of polymer-based construction material 302 can be treated with ionized plasma such that the surface energy increases from the polymer-based construction material's inherent surface energy to the predetermined surface energy (or to a surface energy above the inherent surface energy when a secondary process is performed to increase the surface energy to the predetermined surface energy).

In another exemplary aspect of block 202, a corona treatment system applies high-frequency power through a ceramic and/or metal electrode array across an intentional air gap onto the surface of the polymer-based construction material. The corona device can be a bare roller, a covered roller, or any other corona device. A corona treatment system generates an ionized corona discharge that increases the surface energy of the surface. In an aspect, the corona treatment system also performs a backside treatment. In an example aspect, the non-mechanical treatment device 124 increased the surface energy of a surface of the polymer-based construction material's inherent surface energy to a predetermined surface energy. For example, and with brief reference to FIGS. 3A and 3B, a first surface 304 of polymer-based construction material 302 may be treated by the corona treatment system such that the ionized blown gas is incorporated into the first surface 304. As a result, the surface energy of the first surface 304 may increase from the polymer-based construction material's inherent surface energy to the predetermined surface energy (or to a surface energy above the inherent surface energy when a secondary process is performed to increase the surface energy to the predetermined surface energy). In some aspects, corona treatment can be advantageous as the precision and relatively low temperature of the corona electrode array may facilitate uniform surface energy enhancement of some compositions of the polymer-based construction material described herein.

In yet another exemplary aspect, block 202 comprises application of at least one of a coating of UV curable monomers, oligomers, adhesion promoters, primers, photoinitiators, and pigments. Additionally, in some aspects, the coating may comprise an acrylate, such as THF acrylate, beta carboxy ethyl acrylate, ethyl hexyl acrylate, N-vinyl pyrolidone, and any other acrylate compound to a surface of the polymer-based construction material. The coating system may comprise one or more computer and/or manually controlled sprayers, vacuum applicators, curtain coater, slot die applicators, and/or roll coating. As an illustrative example, in an aspect, a pre-metered coating with a viscosity between 300 and 2000 cP is applied to the surface of the polymer-based construction material by a curtain coater. Turning briefly to FIG. 3C, and with continued reference to FIG. 2A, the coating system may apply the coating 320 with a thickness of between 5 and 37 microns to at least surface 304 of the polymer-based construction material 302. In some aspects, the coating 320 is applied with a thickness of between 10 and 30 microns. In some aspects, the coating 320 is applied with a thickness of between 12 and 25 microns. After the coating 320 is applied to the surface 304, the polymer-based construction material 302 can be treated with radiation from a mercury arc lamp, microwave powered sealed mercury arc lamp, and/or UV LED array, incorporated with or independent from the coating system, until the coating is cured. The radiation can be of a wavelength between 350 nm and 410 nm. In an aspect, the wavelength is between 385 nm and 405 nm. Because a coating with a viscosity between 300 and 2000 cP is applied in an example from a curtain coater, with a thickness between 10 and 30 microns, and cured by radiation with a wavelength between 350 nm and 410 nm, the surface energy of the polymer-based construction material must be increased to at least 40 dynes/cm$^2$. Additionally, subsequent painting of the coated surface can achieve an adhesive bond of at least 4B bond at least 3 days after coating.

In response to the treatment, the surface energy of the polymer-based construction material increases to at least 40 dynes/cm$^2$ at block 204. In some aspects, the surface energy may be increased to a predetermined value ≥40 dynes/cm$^2$. For example, in an aspect, the predetermined value is between 40 dynes/cm$^2$ and 70 dynes/cm$^2$. In an aspect, the predetermined value is between 45 dynes/cm$^2$ and 65 dynes/cm$^2$. In an aspect, the predetermined value is between 50 dynes/cm$^2$ and 60 dynes/cm$^2$. In an aspect, the predetermined value is between 50 dynes/cm$^2$ and 58 dynes/cm$^2$. In an aspect, the predetermined value is between 45 dynes/cm$^2$ and 60 dynes/cm$^2$. In an aspect, the predetermined value is between 40 dynes/cm$^2$ and 60 dynes/cm$^2$. In some aspects, the surface energy of the polymer-based construction material's surface persists within 20% of the predetermined surface energy for at least three days. For example, if the predetermined surface energy is between 40 dynes/cm$^2$ and 70 dynes/cm$^2$, the surface energy of the polymer-based construction material's surface persists between, at least, 32 dynes/cm$^2$ and 56 dynes/cm$^2$ for at least three days.

At least one advantage provided by method 200 may be that the surface energy of the treated surface persists for significantly longer periods of time than previously believed possible. For example, it is a common belief that painting of polymer-based construction materials should occur within minutes and no more than a few hours post-treatment. However, in some aspects of method 200, the surface energy of the polymer-based construction material, such as polymer-based construction material 302, treated in accordance with aspects of block 202 persists within 20% of the predetermined surface energy for ≥3 days, at block 204. In some aspects, the post-treatment surface energy persists within 20% of the predetermined surface energy for ≥1 month. In some aspects, the post-treatment surface energy persists within 20% of the predetermined surface energy for ≥3 months. In some aspects, the post-treatment surface energy persists within 20% of the predetermined surface energy for ≥6 months. In some aspects, the post-treatment surface energy persists within 20% of the predetermined surface energy for ≥20 months. Said another way, method 200 may further comprise temporary storage of polymer-based construction material in a warehouse, retailer, and so on (collectively 130), without painting, for a period of time post-treatment 132. Additionally, and/or alternatively, the polymer-based construction material may be transported to and used for its intended purpose, without painting, for a period of time post-treatment 132. Later (such as ≥3 days, ≥1 month, ≥3 months, ≥6 months, ≥20 months) the polymer-based construction material may be painted at least partially because the post-treatment surface energy persists within 20% of the predetermined surface energy for ≥3 days, ≥1 month, ≥3 months, ≥6 months, or ≥20 months. Said another way, the recited polymeric composition comprising $CaCO_3$ and ≤7% $TiO_2$ that is treated to have a surface energy of at least 40 dynes/cm$^2$ through aspects of block 202 may be able to have a surface energy that persists within 20% for at least three days from the treatment of the surface. The surface energy may be tested by, for example, a dyne pen or any other suitable testing method.

Figure 3A:
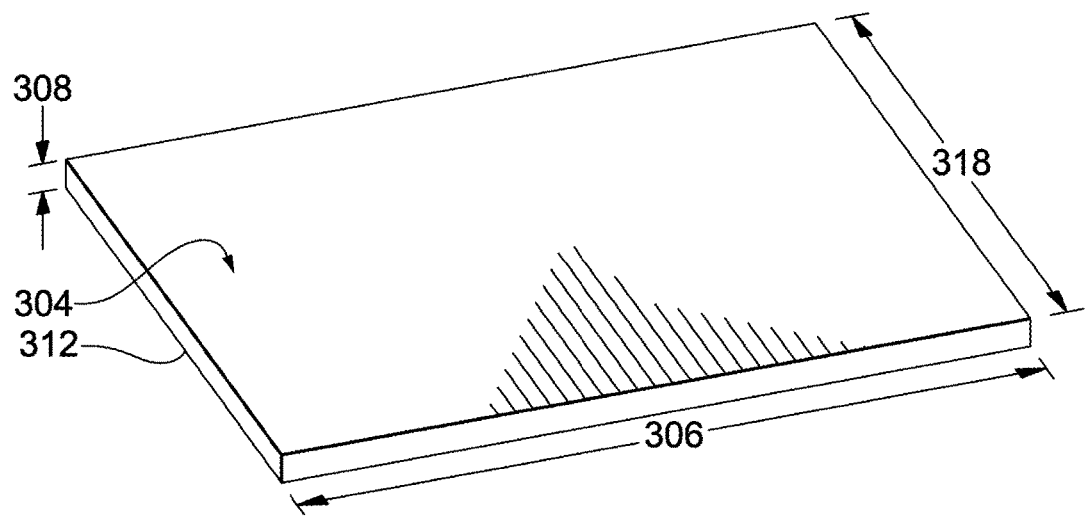
FIGS. 3A, 3B, and 3C depict various views of an example polymer-based construction material, according to aspects described herein.
Figure 3B:
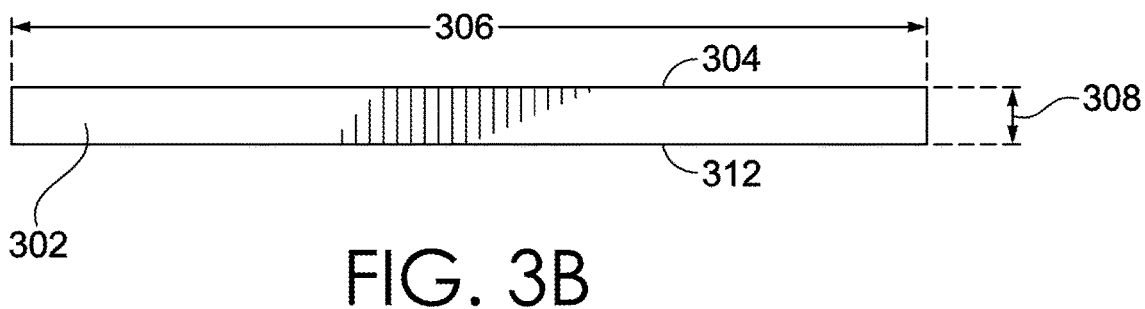
Figure 3C:
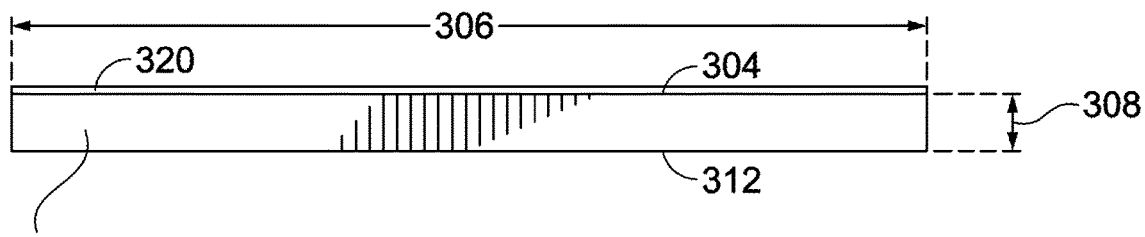

With reference to FIGS. 3A, 3B, and 3C, an example polymer-based construction material is provided in accordance with aspects described herein. The polymer-based construction material 302 may be a trim component (e.g. trim board), a siding component (e.g. siding board, siding shingle, or a siding sheet), a roofing component (e.g. roofing board, roofing shingle, roofing sheet), corner board component, a column wrap component, a post cover component, a molding component, a decking component (e.g. decking board, decking sheet, deck flooring, deck railing), a decorative and/or functional construction accessory, or any other construction material(s). Additionally, in some aspects, the polymer-based construction material 302 can be used as a painting canvas or any other material for artistic expression. The polymer-based construction material 302 comprises a polymeric resin, one or more fillers, and $TiO_2$. In an example aspect, the filler comprises $CaCO_3$. Further, the construction material 302 may comprise a thermal stabilizer, calcium stearate, and/or at least one wax, in some aspects. In some aspects, the polymeric resin is between 45% and 80% of the construction material by weight or mass. In some aspects, the fillers comprise between 0.14% and 50% of the construction material by weight or mass. In an aspect, $CaCO_3$ comprises between 0.14% and 50% of the construction material by weight or mass. In some aspects, the $TiO_2$ comprises less than 7% of the construction material by weight or mass. In some aspects, the polymer-based construction material is a cellular or foamed material. Further, the polymer-based construction material 302 comprises a first surface 304, and a second surface 312 opposite the first surface 304.

Contrary to a common belief in the industry that painting polymer-based construction materials must happen within seconds of increasing the surface energy of the materials, the combination of the compositions and the preparations/treatments described herein may facilitate increased surface energy ≥40 dynes/cm² that persists within 20% for at least three days. Accordingly, in an aspect, the polymer-based construction material 302 is treated such that the surface energy of the first surface 304 is increased to a predetermined value that persists within 20% of the predetermined value for at least 3 days. The predetermined value can be ≥40 dynes/cm². For example, the polymer-based construction material 302 may be treated as discussed in relation to FIGS. 2A and 2B.

Further, the polymer-based construction material 302 comprises a gauge (thickness) 308, a length 306, and a width 318. The gauge 308 may be any thickness and may vary based on the intended use. In some aspects, the gauge 308 is between 0.10 inches and 2.00 inches. In some aspects, the gauge 308 is between 0.125 inches and 1.75 inches. In some aspects, the gauge 308 is between 0.25 inches and 1.5 inches. In some aspects, the gauge 308 is between 0.5 inches and 1.0 inch. In an aspect, the gauge 308 is 0.25 inches.

The length 306 may be any length and may vary based on the intended use. In some aspects, the length 306 is between 0.5 feet (ft.) and 60 ft. In an aspect, the length 306 is between 1.0 ft. and 50 ft. In some aspects, the length 306 is between 2 ft. and 30 ft. In some aspects, the length 306 is between 8 ft. and 20 ft. In an aspect, the length 306 is between 9 inches (0.75 ft.) and 36 inches (3 ft.). In an aspect, the length 306 is between 12 inches (1 ft.) and 24 inches (2 ft.).

The width 318 may be any width and may vary based on the intended use. For example, a polymer-based construction material intended for use as a siding component may be a first width, while a polymer-based construction material intended for use as a trim board may be a second width, while a polymer-based construction material intended for use as a construction accessory may be a third width, and so on. In some aspects, width 318 is between 12 inches (1 ft.) and 80 inches (6.6 ft.). In some aspects, width 318 is at least 15 inches (1.25 ft.), 24 inches (2 ft.), 36 inches (3 ft.), or 48 inches (4 ft.). In some aspects, width 318 is less than or equal to 80 inches (6 ft. 8 inches). Additionally, in some aspects, a polymer-based construction material (such as construction material 302) can be cut into a selectable combination of uniform and/or non-uniform widths of individual narrower sheets.

Although depicted as a uniformly flat surface, it will be understood by those skilled in the art that the first surface 304 and/or the second surface 312 may be in any configuration. For example, the polymer-based construction material may be manufactured such that the first surface 304 substantially replicates what is commonly referred to as a "slatwall" pattern, "tongue and groove" pattern, a "shingle" or "shake" pattern, a "lap" pattern, or other similar patterns. Similarly, the second surface 312 may be shaped such that the gauge of any particular cross section of the polymer-based construction material is relatively consistent throughout the material. Additionally, or alternatively, the first surface 304 of the polymer-based construction material may substantially replicate wood grain patterns, natural or masoned stone patterns, uniform or off-set brick patterns, or other similar patterns.

Various example aspects are described herein as comprising $CaCO_3$. However, it will be understood by those skilled in the art that references to $CaCO_3$ are not intended to be—and should not be interpreted as—excluding other fillers described herein or otherwise limiting aspects described herein. For example, it is contemplated that any filler or combination of fillers described herein can be included with or replace $CaCO_3$ as a filler in any aspect described. In other words, $CaCO_3$ is used as an illustrative, and non-limiting, example.

Those skilled in the art will understand that many other methods for producing a polymer-based construction material may be used in accordance with aspects described herein. Further, it will be understood in light of the description provided herein that the recited polymeric composition comprising between 0.14% and 25% filler (such as $CaCO_3$) and at most 7% $TiO_2$ that is treated to have a surface energy of at least 40 dynes/cm² through disclosed mechanical or non-mechanical methods is able to have a surface energy that persists within 20% for at least three days from the treatment of the surface. Accordingly, the specific compositions, techniques, and surface treatments provided herein may be capable of achieving and maintaining a target minimal surface energy capable of allowing a sufficient bond strength between the polymer-based construction material and the paint applied later in time (e.g., at least three days after the extrusion of the polymer-based material). However, the absence of a particular production or manufacturing method should not be interpreted as limiting; rather, the absence is merely a function of providing a clear description of the features described herein. Accordingly, it will be understood that the method described above is merely an illustrative example and not intended to limit the scope of the aspects described herein. For example, the polymer-based construction materials can be assembled to form a corner board, column wrap, post cover, molding, or any other multi-component construction material. For another example, some aspects of the post-treatment polymer-based construction materials can have a surface energy high enough that traditional adhesives used for product labeling (such as marketing, pricing, universal product code (UPC) labeling, or any other labels affixed to the surface via traditional adhesives) are relatively difficult to remove without leaving an adhesive residue. Accordingly, in some aspects, the polymer-based construction materials are labeled with low residual adhesive labels.

Figure 4:
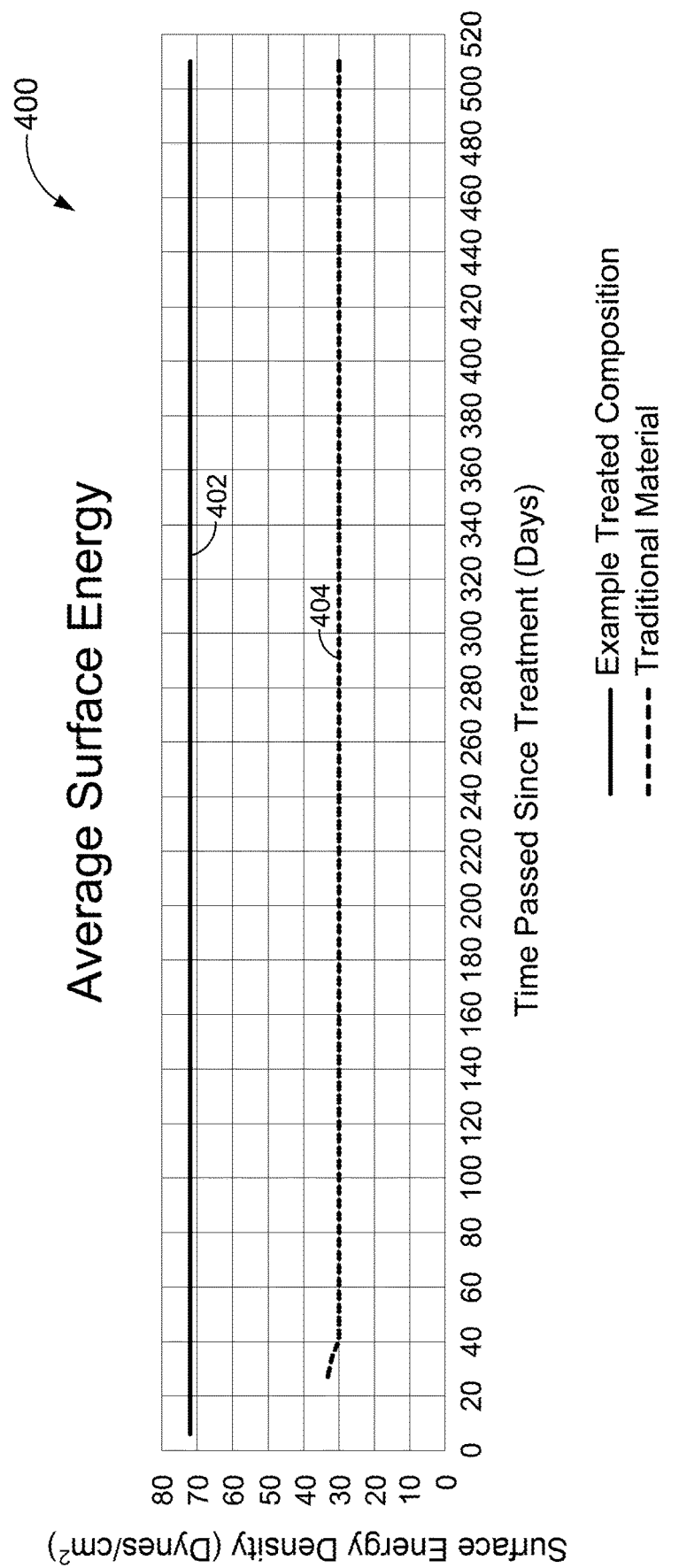
FIG. 4 depicts a comparison of the surface energy of treated polymer-based construction materials in accordance with aspects described herein to a traditional and untreated construction material.

Turning to FIG. 4, a depiction of a selected subset of ASTM D2578 (2018 volume of *ASTM Tests for Chemical, Physical, and Optical Properties*) test results 400 is provided in accordance with aspects described herein. Generally, FIG. 4 depicts the surface energy of polymer-based construction materials (e.g., PVC) manufactured and treated in accordance with aspects described herein 402 compared to a traditional and untreated construction material 404. The exemplary polymer-based construction materials 402 were treated on day 0 to increase the surface energy from the inherent surface energy to a predetermined value of 72 dynes/cm². The traditional and untreated construction material 404 was used as a control beginning on post-treatment day 26. The traditional and untreated construction material 404 had a post-manufacturing inherent surface energy of 36 dynes/cm². The surface energy was tested, via ASTM D2578, every five to ten days. As depicted, the average surface energy of the exemplary polymer-based construction materials 402 remained at 72 dynes/cm² through day 508. In contrast, the surface energy of the traditional and untreated construction material 404 fell rapidly from 36 dynes/cm² to 30 dynes/cm² by day 40.

In an example embodiment, the polymer-based construction comprises 76.92% polymeric resin by weight or mass, 11.54% fillers (such as $CaCO_3$) by weight or mass, ≤1%

TiO$_2$ by weight or mass, 5.58% BMW acrylic modifiers by weight or mass, and ≤6% other additional ingredients by weight or mass.

In another example embodiment, the polymer-based construction material comprises 76.9% polymeric resin by weight or mass, 9.2% fillers (such as CaCO$_3$) by weight or mass, ≤3.1% TiO$_2$ by weight or mass, 5.6% HMW acrylic modifiers by weight or mass, and ≤6% other additional ingredients by weight or mass.

In another example embodiment, the polymer-based construction material comprises 77.5% polymeric resin by weight or mass, 9.3% fillers (such as CaCO$_3$) by weight or mass, ≤3% TiO$_2$ by weight or mass, 5.6% HMW acrylic modifiers by weight or mass, and ≤6% other additional ingredients by weight or mass.

In another example embodiment, the polymer-based construction material comprises 77.5% polymeric resin by weight or mass, 9.3% fillers (such as CaCO$_3$) by weight or mass, ≤2.5% TiO$_2$ by weight or mass, 5.6% HMW acrylic modifiers by weight or mass, and ≤5.3% other additional ingredients by weight or mass.

In another example embodiment, the polymer-based construction material comprises 78.1% polymeric resin by weight or mass, 9.4% fillers (such as CaCO$_3$) by weight or mass, ≤3% TiO$_2$ by weight or mass, 5.6% HMW acrylic modifiers by weight or mass, and ≤6% other additional ingredients by weight or mass.

In another example embodiment, the polymer-based construction material comprises 78.3% polymeric resin by weight or mass, 9.5% fillers (such as CaCO$_3$) by weight or mass, ≤0.8% TiO$_2$ by weight or mass, 5.7% HMW acrylic modifiers by weight or mass, and ≤5.8% other additional ingredients by weight or mass.

In another example embodiment, the polymer-based construction material comprises 79.4% polymeric resin by weight or mass, 9.5% fillers (such as CaCO$_3$) by weight or mass, 0.0% TiO$_2$ by weight or mass, 5.8% BMW acrylic modifiers by weight or mass, and ≤5.4% other additional ingredients by weight or mass.

In yet another example embodiment, the polymer-based construction material comprises 76.9% polymeric resin by weight or mass, 10.0% fillers (such as CaCO$_3$) by weight or mass, ≤2.4% TiO$_2$ by weight or mass, 5.6% HMW acrylic modifiers by weight or mass, and ≤5.2% other additional ingredients by weight or mass.

In another example embodiment, the polymer-based construction material comprises 76.9% polymeric resin by weight or mass, 10.8% fillers (such as CaCO$_3$) by weight or mass, ≤1.6% TiO$_2$ by weight or mass, 5.6% HMW acrylic modifiers by weight or mass, and ≤5.2% other additional ingredients by weight or mass.

In another example embodiment, the polymer-based construction material comprises 76.9% polymeric resin by weight or mass, 12.3% fillers (such as CaCO$_3$) by weight or mass, 0.0% TiO$_2$ by weight or mass, 5.6% HMW acrylic modifiers by weight or mass, and ≤5.4% other additional ingredients by weight or mass.

In another example embodiment, the polymer-based construction material comprises 77.1% polymeric resin by weight or mass, 11.6% fillers (such as CaCO$_3$), ≤0.8% TiO$_2$ by weight or mass, 5.6% HMW acrylic modifiers by weight or mass, and ≤4.5% other additional ingredients by weight or mass.

In another example embodiment, the polymer-based construction material comprises 76.9% polymeric resin by weight or mass, 12.3% fillers (such as CaCO$_3$) by weight or mass, 0.0% TiO$_2$ by weight or mass, 5.6% HMW acrylic modifiers by weight or mass, and ≤5.2% other additional ingredients by weight or mass.

In another example embodiment, the polymer-based construction material comprises 48.2% polymeric resin by weight or mass, 40.1% fillers (such as CaCO$_3$), ≤0.14% TiO$_2$ by weight or mass, 5.8% HMW acrylic modifiers by weight or mass, and ≤5.9% other additional ingredients by weight or mass.

In another example embodiment, the polymer-based construction material comprises 69.6% polymeric resin by weight or mass, 20.1% fillers (such as CaCO$_3$) by weight or mass, ≤0.7% TiO$_2$ by weight or mass, 5.1% HMW acrylic modifiers by weight or mass, and ≤4.7% other additional ingredients by weight or mass.

In another example embodiment, the polymer-based construction material comprises 69.6% polymeric resin by weight or mass, 20.0% fillers (such as CaCO$_3$) by weight or mass, ≤0.7% TiO$_2$ by weight or mass, 5.1% HMW acrylic modifiers by weight or mass, and ≤4.8% other additional ingredients by weight or mass.

In yet another example embodiment, the polymer-based construction material comprises 75.2% polymeric resin by weight or mass, 13.6% fillers (such as CaCO$_3$) by weight or mass, ≤0.8% TiO$_2$ by weight or mass, 5.5% HMW acrylic modifiers by weight or mass, and ≤5.1% other additional ingredients by weight or mass.

In another example embodiment, the polymer-based construction material comprises 72.5% polymeric resin by weight or mass, 16.8% fillers (such as CaCO$_3$) by weight or mass, ≤0.8% TiO$_2$ by weight or mass, 5.3% HMW acrylic modifiers by weight or mass, and ≤5.0% other additional ingredients by weight or mass.

In another example embodiment, the polymer-based construction material comprises 74.7% polymeric resin by weight or mass, 14.1% fillers (such as CaCO$_3$) by weight or mass, ≤0.8% TiO$_2$, 5.4% HMW acrylic modifiers by weight or mass, and ≤5.2% other additional ingredients by weight or mass.

In another example embodiment, the polymer-based construction material comprises 69.5% polymeric resin by weight or mass, 20.1% fillers (such as CaCO$_3$) by weight or mass, ≤0.7% TiO$_2$ by weight or mass, 5.1% HMW acrylic modifiers by weight or mass, and ≤4.9% other additional ingredients by weight or mass.

In another example embodiment, the polymer-based construction material comprises 76.2% polymeric resin by weight or mass, 14.0% fillers (such as CaCO$_3$) by weight or mass, ≤0.8% TiO$_2$ by weight or mass, 3.9% HMW acrylic modifiers by weight or mass, and ≤5.3% other additional ingredients by weight or mass.

In another example embodiment, the polymer-based construction material comprises 69.5% polymeric resin by weight or mass, 20.0% fillers (such as CaCO$_3$) by weight or mass, ≤0.7% TiO$_2$ by weight or mass, 5.1% HMW acrylic modifiers by weight or mass, and ≤5.0% other additional ingredients by weight or mass.

In another example embodiment, the polymer-based construction material comprises 70.6% polymeric resin by weight or mass, 20.3% fillers (such as CaCO$_3$) by weight or mass, ≤0.8% TiO$_2$ by weight or mass, 3.6% HMW acrylic modifiers by weight or mass, and ≤5.0% other additional ingredients by weight or mass.

In another example embodiment, the polymer-based construction material comprises 70.6% polymeric resin by weight or mass, 20.4% fillers (such as CaCO$_3$) by weight or mass, ≤0.8% TiO$_2$ by weight or mass, 3.6% HMW acrylic modifiers by weight or mass, and ≤5.0% other additional ingredients by weight or mass.

In another example embodiment, the polymer-based construction material comprises polymeric resin in the range of 70%-75% by weight or mass, $CaCO_3$ in the range of 15%-13% by weight or mass, and $TiO_2$ in the range of 0.8%-0.6% by weight or mass.

In another example embodiment, the polymer-based construction material comprises polymeric resin in the range of 73%-75% by weight or mass, $CaCO_3$ in the range of 15%-13% by weight or mass, and $TiO_2$ in the range of 0.8%-0.6% by weight or mass.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations. Further, the terminology "any of clauses" or similar variations of said terminology is intended to include "any one of clauses" or other variations of such terminology, as indicated by some of the examples provided above.

Clause 1. A method of preparing a polymer-based construction material for future surface painting, the method comprising: in response to a treatment of a surface of the polymer-based construction material, increasing a surface energy of the surface from a first surface energy to a second surface energy of at least 40 dynes/cm2, the polymer-based construction material comprising a polymeric composition comprising a polymeric resin, a filler, and titanium oxide ($TiO_2$); wherein the surface energy of the surface persists within 20% of the second surface energy for at least three days from the treatment of the surface.

Clause 2. The method of clause 1, wherein the treatment comprises a non-mechanical treatment of the surface.

Clause 3. The method of clause 2, wherein the non-mechanical treatment comprises a plasma or corona treatment.

Clause 4. The method of clause 2 or 3, wherein the non-mechanical treatment comprises an application of a UV curable composition, the UV curable composition including a monomer, oligomer, adhesion promoter, gloss adjusting fillers, photoinitiators, or pigments; and wherein the method further comprises: curing the application of the UV curable composition with radiation from a mercury arc lamp, a microwave powered sealed mercury arc lamp, or LED array; wherein the radiation is between 350 nm and 420 nm.

Clause 5. The method of any of clauses 1 through 4, wherein the treatment comprises a mechanical treatment of the surface.

Clause 6. The method of clause 5, wherein the mechanical treatment comprises sanding or scuffing the surface.

Clause 7. The method of any of clauses 1 through 6, wherein the surface energy of the surface persists within 20% of the second surface energy for at least one month from the treatment of the surface.

Clause 8. The method of any of clauses 1 through 6, wherein the surface energy of the surface persists within 20% of the second surface energy for at least three months from the treatment of the surface.

Clause 9. The method of any of clauses 1 through 6, wherein the surface energy of the surface persists within 20% of the second surface energy for at least twenty months from the treatment of the surface.

Clause 10. The method of any of clauses 1 through 9, wherein the $TiO_2$ comprises ≤7% by weight or mass of the polymer-based construction material.

Clause 11. The method of any of clauses 1 through 10, wherein the $CaCO_3$ comprises ≥8% by weight or mass of the polymer-based construction material.

Clause 12. The method of any of clauses 1 through 11, wherein the polymer-based construction material is a siding component.

Clause 13. The method of any of clauses 1 through 11, wherein the polymer-based construction material is a trim board.

Clause 14. The method of any of clauses 1 through 13, wherein the polymer-based construction material comprises polyvinyl chloride.

Clause 15. A polymer-based construction material comprising: a polymeric resin, a thermal stabilizer, calcium carbonate ($CaCO_3$), and titanium oxide ($TiO_2$), wherein in response to a treatment of a surface of the polymer-based construction material, the surface energy of the surface increases from a first surface energy to a second surface energy of at least 45 dynes/cm$^2$, and wherein the surface energy of the surface persists within 20% of the second surface energy for at least three days from the treatment.

Clause 16. The polymer-based construction material of clause 15, wherein the treatment comprises a non-mechanical treatment of the surface.

Clause 17. The polymer-based construction material of clause 16, wherein the non-mechanical treatment comprises a plasma or corona treatment.

Clause 18. The polymer-based construction material of clause 16, wherein the non-mechanical treatment comprises an application of a UV curable composition, the UV curable composition including a monomer, oligomer, adhesion promoter, gloss adjusting filler, photoinitiator, or pigment; and wherein the non-mechanical treatment further comprises: curing the application of the UV curable composition with radiation from a mercury arc lamp, a microwave powered sealed mercury arc lamp, or LED array; wherein the radiation is between 350 nm and 420 nm.

Clause 19. The polymer-based construction material of any of clauses 16 through 18, wherein the treatment comprises sanding or scuffing the surface.

Clause 20. The polymer-based construction material of any of clauses 15 through 18, wherein the surface energy of the surface persists within 20% of the second surface energy for at least one month from the treatment of the surface.

Clause 21. The polymer-based construction material of any of clauses 15 through 18, wherein the surface energy of the surface persists within 20% of the second surface energy for at least three months from the treatment of the surface.

Clause 22. The polymer-based construction material of any of clauses 15 through 18, wherein the surface energy of the surface persists within 20% of the second surface energy for at least twenty months from the treatment of the surface.

Clause 23. The polymer-based construction material of any of clauses 15 through 22, wherein the polymer-based construction material is a siding component.

Clause 24. The polymer-based construction material of any of clauses 15 through 22, wherein the polymer-based construction material is a trim board.

Clause 25. The polymer-based construction material of any of clauses 15 through 24, wherein the polymer-based construction material comprises polyvinyl chloride.

Clause 26. A polymer-based construction material comprising: a first surface; a second surface, wherein the first surface and the second surface are formed from a common polymeric composition comprising a polymeric resin, calcium carbonate ($CaCO_3$), and titanium oxide ($TiO_2$); the first surface having a first surface energy of at least 45 dynes/$cm^2$ and the second surface having a second surface energy, the first surface energy is greater than the second surface energy.

Clause 27. The polymer-based construction material of clause 26, wherein the $TiO_2$ comprises ≤7% by weight or mass of the polymer-based construction material.

Clause 28. The polymer-based construction material of clause 26 or 27, wherein the CaCO3 comprises >8% by weight or mass of the polymer-based construction material.

Clause 29. The polymer-based construction material of any of clauses 26 through 28, further comprising a third surface, wherein the first surface is at least partially covered by the third surface, and wherein the third surface comprises a UV curable material, monomer, oligomer, adhesion promoter, gloss adjusting filler, photoinitiator, or pigment.

Clause 30. The polymer-based construction material of any of clauses 26 through 29, wherein the surface energy of the surface persists within 20% of the second surface energy for at least one month from the treatment of the surface.

Clause 31. The polymer-based construction material of any of clauses 26 through 29, wherein the surface energy of the surface persists within 20% of the second surface energy for at least twenty months from the treatment of the surface.

Clause 32. The polymer-based construction material of any of clauses 26 through 31, wherein the polymer-based construction material is a siding component.

Clause 33. The polymer-based construction material of any of clauses 26 through 31, wherein the polymer-based construction material is a trim board.

Clause 34. The polymer-based construction material of any of clauses 26 through 33, wherein the polymer-based construction material comprises polyvinyl chloride.

Clause 35. The polymer-based construction material of any of clauses 15 through 34, wherein the surface energy is at least 70 dynes/cm2.

Clause 36. The polymer-based construction material of any of clauses 15 through 35, wherein the polymer-based construction material comprises polymeric resin in the range of 70%-75% by weight or mass, $CaCO_3$ in the range of 15%-13% by weight or mass, and $TiO_2$ in the range of 0.8%-0.6% by weight or mass.

Clause 37. The polymer-based construction material of any of clauses 15 through 35, In another example embodiment, the polymer-based construction material comprises polymeric resin in the range of 73%-75% by weight or mass, $CaCO_3$ in the range of 15%-13% by weight or mass, and $TiO_2$ in the range of 0.8%-0.6% by weight or mass.

The invention claimed is:

1. A method of preparing an extruded polymer-based construction material for future surface painting, the method comprising:
   in response to a treatment of a surface of the extruded polymer-based construction material, increasing a surface energy of the surface from a first surface energy to a second surface energy of at least 40 dynes/$cm^2$, the polymer-based construction material comprising a polymeric composition including a polymeric resin and a filler;
   wherein the surface energy of the surface persists within 20% of the second surface energy for at least one month from the treatment of the surface.

2. The method of claim 1, wherein the treatment comprises a plasma or corona treatment.

3. The method of claim 1, wherein the treatment includes an application of a UV curable composition, the UV curable composition including a monomer, oligomer, adhesion promoter, gloss adjusting filler, photoinitiator, or pigment; and wherein the method further comprises:
   curing the application of the UV curable composition with radiation from a mercury arc lamp, a microwave powered sealed mercury arc lamp, or LED array;
   wherein the radiation is between 350 nm and 420 nm.

4. The method of claim 3, wherein the UV curable composition is applied to the polymer-based construction material with a thickness in a range of 5 and 37 microns.

5. The method of claim 3, wherein the UV curable composition has a viscosity in a range of 300 and 2000 cP.

6. The method of claim 1, wherein the treatment includes sanding or scuffing the surface.

7. The method of claim 1, wherein the surface energy of the surface persists within 20% of the second surface energy for at least six months from the treatment of the surface.

8. The method of claim 1, wherein the filler comprises $CaCO_3$, and wherein the $CaCO_3$ is present in an amount of ≥8% by weight of the polymer-based construction material.

9. The method of claim 1, wherein the polymer-based construction material is a siding component, trim board, deck board, shingle, corner board, or a portion of a column wrap, post cover, or molding.

10. An extruded polymer-based construction material comprising:
    a first surface, and
    a second surface opposite the first surface,
    wherein the first surface and the second surface comprise a polymeric composition comprising a polymeric resin and one or more fillers;
    wherein the first surface, the second surface, or both, exhibit a surface energy within 20% of 50 dynes/$cm^2$ for at least one month.

11. The polymer-based construction material of claim 10, wherein the one or more fillers includes $CaCO_3$, and wherein the $CaCO_3$ is present in an amount of ≥8% by weight of the polymer-based construction material.

12. The polymer-based construction material of claim 10, further comprising a layer of a UV curable material adhered to the first surface, wherein the layer of the UV curable material has a thickness in a range of 5 and 37 microns.

13. The polymer-based construction material of claim 10, wherein the polymeric composition does not include a plasticizer.

14. The polymer-based construction material of claim 10, wherein the polymeric composition does not include diisononyl phthalate (DINP) or diisodecyl phthalate (DIDP).

15. The polymer based construction material of claim 10, wherein the polymeric composition includes a high molecular weight (HMW) acrylic process aid.

16. The polymer-based construction material of claim 11, wherein the polymer-based construction material is a siding component, trim board, deck board, shingle, corner board, or a portion of a column wrap, post cover, or molding.

17. The polymer-based construction material of claim 11, wherein the polymeric resin comprises polyvinyl chloride.

18. An extruded polymer-based construction material comprising:
   a first surface;
   a second surface, wherein the first surface and the second surface are formed from an extruded polymeric composition comprising a polymeric resin in the range of 70%-75% by weight and calcium carbonate ($CaCO_3$) in the range of 15%-13% by weight;
   the first surface having a first surface energy of at least 45 dynes/cm' and the second surface having a second surface energy, the first surface energy is greater than the second surface energy and persists within 20% of the first surface energy for at least three months.

19. The polymer-based construction material of claim 18, further comprising a third surface with a thickness in a range of 5 microns and 37 microns, wherein the first surface is at least partially covered by the third surface, and wherein the third surface comprises a UV curable material, monomer, oligomer, adhesion promoter, gloss adjusting filler, photoinitiator, or pigment.

20. The polymer-based construction material of claim 18, wherein the polymer-based construction material is a siding component, trim board, deck board, shingle, corner board, or a portion of a column wrap, post cover, or molding.

* * * * *

UNITED STATES PATENT AND TRADEMARK OFFICE
CERTIFICATE OF CORRECTION

PATENT NO. : 11,987,683 B2
APPLICATION NO. : 17/699867
DATED : May 21, 2024
INVENTOR(S) : Bruce Edward Stanhope et al.

It is certified that error appears in the above-identified patent and that said Letters Patent is hereby corrected as shown below:

On the Title Page

Item (72), Line 5, inventor information, in the line reading "David Joel Parker, Middleville, MI" should read --David Joel Parker, Jr., Middleville, MI--.

In the Claims

Column 21, Line 1, Claim 15, in the line reading "15. The polymer based construction material of claim 10," should read --15. The polymer-based construction material of claim 10,--.

Column 22, Line 2, in Claim 18, in the line reading "dynes/cm' and the second surface having a second" should read --dynes/cm$^2$ and the second surface having a second--.

Signed and Sealed this
Sixth Day of August, 2024

Katherine Kelly Vidal
*Director of the United States Patent and Trademark Office*